Sept. 29, 1964 R. J. MEHKI 3,150,729
VEHICLE AXLE WEIGHING SCALE WITH REMOTE INDICATOR
Original Filed May 21, 1956 2 Sheets-Sheet 1
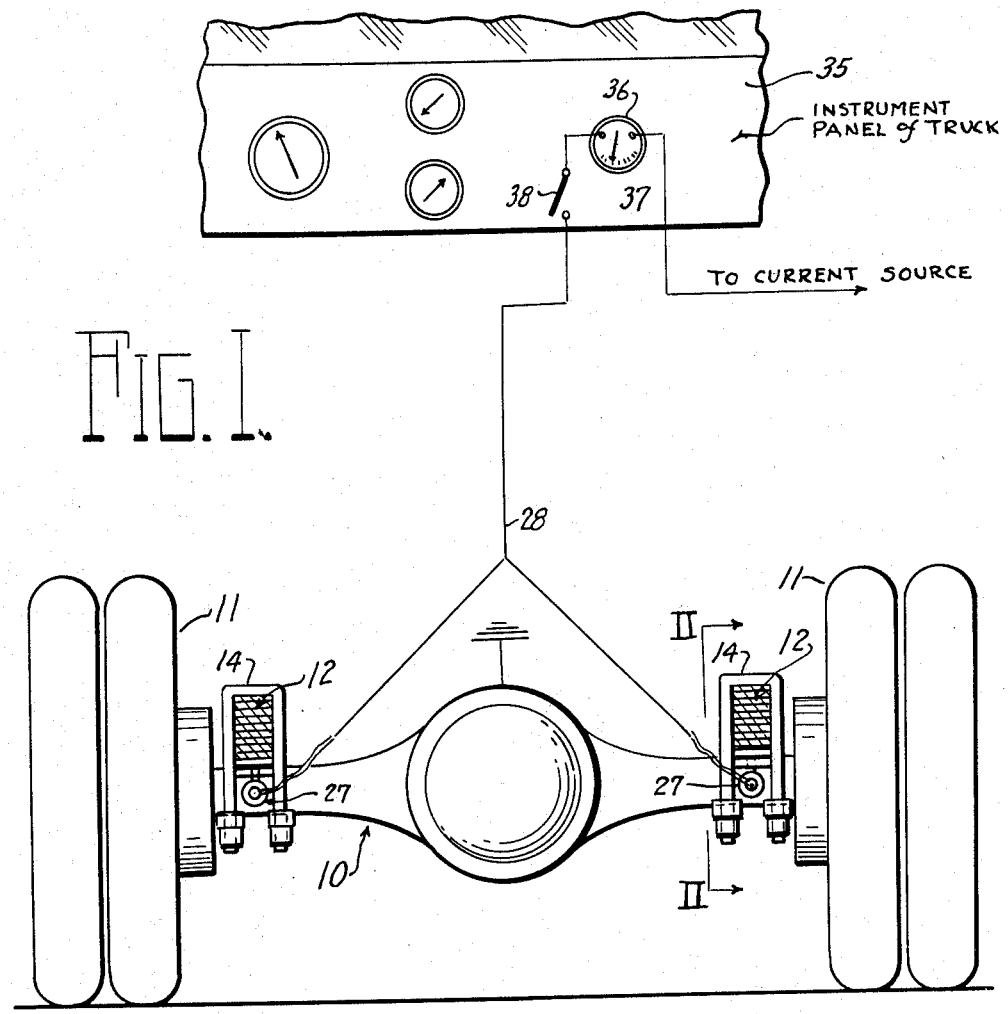
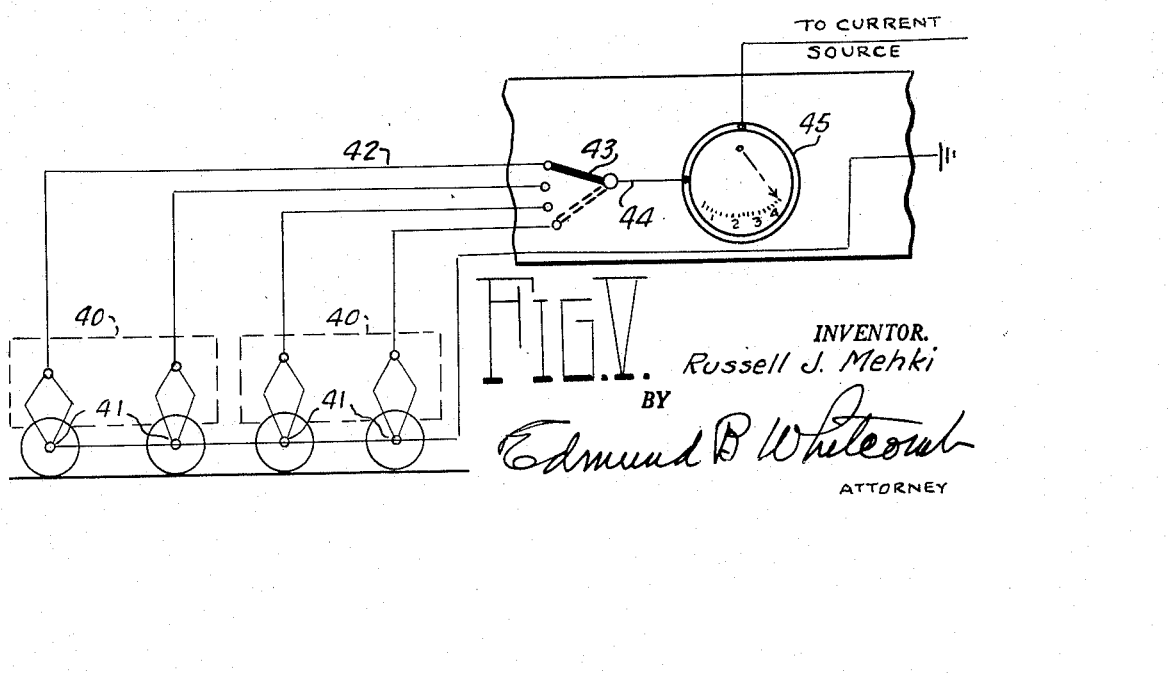
INVENTOR.
Russell J. Mehki
BY
Edmund B Whitcomb
ATTORNEY

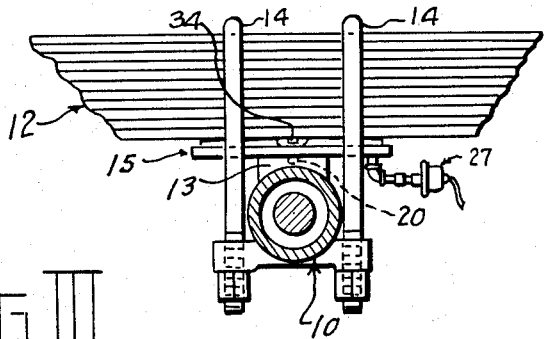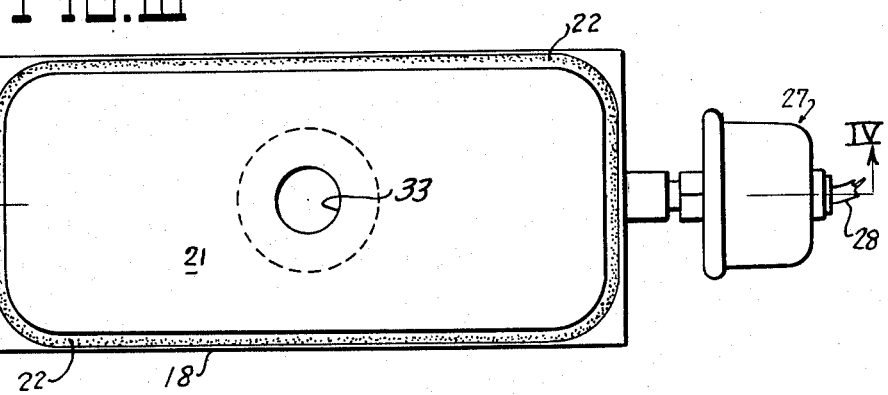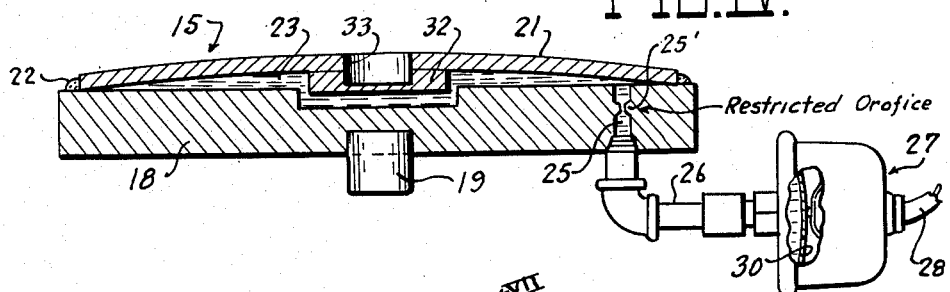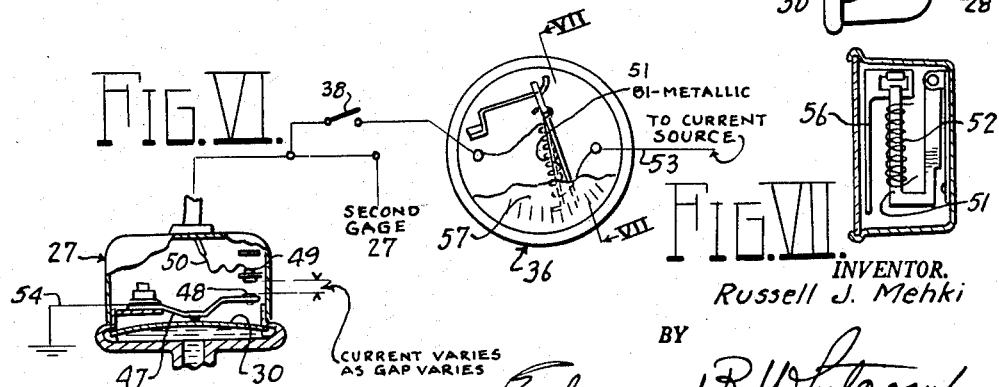

United States Patent Office 3,150,729
Patented Sept. 29, 1964

3,150,729
VEHICLE AXLE WEIGHING SCALE WITH REMOTE INDICATOR
Russell J. Mehki, 3450 Swartz Road, La Salle, Mich., assignor to Russell J. Mehki, Raymond G. Mehki, Alvin L. Mehki, Fred D. Mehki, Lorence Rodenbeck, Donald Rodenbeck, and Richard C. Elconin
Continuation of application Ser. No. 586,275, May 21, 1956. This application Mar. 22, 1963, Ser. No. 267,263
2 Claims. (Cl. 177—141)

This invention relates to a plurality of sealed metallic flexible containers for a fluid, interposed one between each spring seat and the axle of vehicles such as motor trucks, and means to communicate the weight pressure from said flexible fluid containers to an electric measuring device adapted to be located near the driver's seat to register the load on said axle or axles.

The principal object of this invention is to get the correct weight of a vehicle load on a given axle of a vehicle, as a motor truck, and involves the arrangement in which the entire weight passes through the pressure measuring unit and gives very accurately the correct weight.

More specifically, this invention provides in one embodiment thereof such a pressure registering device adapted to be located between the axles and the springs of motor trucks, comprising a spring steel upper flexure plate, a lower plate, said spring steel plate welded to said lower plate and adapted to receive a charge of liquid between said plates and means for recording the variations in pressure on said liquid.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE I is a diagrammatic showing of the unit applied to a motor truck axle and the electrical connections to the dash;

FIGURE II is a section taken substantially on the line II—II of FIGURE I;

FIGURE III is a plan view of an individual unit;

FIGURE IV is a section on the line IV—IV of FIGURE III;

FIGURE V is a diagrammatic view of this invention used with a plurality of axles as for example trailers;

FIGURE VI is a diagrammatic view of a pressure gauge and an electrical scale indicator.

FIGURE VII is a section on the line VII—VII of FIGURE VI.

In FIGURE I, 10 represent the axle of a vehicle such as motor truck having the rubber tires 11 and the vehicle springs 12, one located at each end of the axle 10. As shown in FIGURE II the axle has the usual spring supporting pad 13 and the usual U-bolts 14 for clamping the spring 12 to the axle. Interposed between the pad 13 an the springs 12 is located the sealed fluid containing chamber of the weight measuring unit of this invention indicated at 15, and this unit is positioned between the springs 12 and the axle 10 so that the entire weight supported by the axle at this point passes through the measuring unit 15.

As shown in FIGURES III and IV one embodiment of this sealed unit 15 comprises a base member 18 of relatively thick steel having a pin 19 secured thereto to fit into a recess 20 located in the pad 13 as indicated in FIGURE II. This positions the unit in place in the axle pad 13.

While the base member 18 is made of relatively rigid steel, the unit 15 is provided with an upper cover member 21 of bowed flexible spring steel welded at its edges as shown at 22 to the base member 18. This forms a chamber 23 into which fluid such as oil may be located and to this end a hole is drilled through the base 18 to form a passageway 25 and a suitable fluid pipe 26 is connected at one end with the passage 25 and at its other end to a fluid pressure gage 27 as shown, for example, as a type illustrated in the patent to Slough 2,066,700. The fluid gage 27 has the usual pressure diaphragm 30 located therein and the usual electrical means responding to said pressure with the outside lead connection 28.

The orifice 25 in the plate 18 has a restricted section 25' as shown in FIGURE IV so that the flow of oil from chamber 23 to the diaphragm 30 is greatly restricted. The upper plate 21 has secured thereto on the inside thereof a circular metal piece 32 so that an upper recess 33 may be provided in the upper plate 21 to receive the usual depending tenon 34 carried by the springs 12. This recess 33 with the pin 19 in the lower plate properly locates the unit 15 between springs 12 and the axle 10.

In FIGURE I, the dash board of the truck is indicated at 35 and a suitable electrical indicating device 36 is adapted to be actuated by the electrical connection 28 from the gage 27 so that the variations in pressure on the diaphragm 30 are shown at the driver's seat on the scale 37 of the electrical instrument 36. A switch 38 is located in the circuit 28 so that the weight indicator 36 can be connected and disconnected at will.

In FIGURE V is shown a plurality of trailers 40 having axles 41 and a weight measuring unit 15 may be located under each spring of each axle. The wires 42 from said axles lead to a four-way switch 43 with a single connector 44 to the single electrical indicator 45. By turning switch 43 to any one of the selected trailer axles, the weight on that particular axle will be indicated on the dial 45.

By providing the restricted orifice 25' in the passageway 25, the surge of oil to diaphragm 30 when the truck movement is in use is greatly reduced. Moreover the switch 38 permits the electrical circuits to be disconnected when the vehicle is in motion on the road and the weight determined when the vehicle is stationary by simply closing switch 38.

As shown in FIGURES VI and VII, a standard type of fluid gage 27 and an indicating means electrically operated includes a flexible current conducting metallic member 47 contacting diaphragm 30. Member 47 has a terminal 48 adapted to be moved toward and away from terminal 49 which is connected by lead 50 through switch 38 to the electrical scale indicator 36. One type of such indicator includes a bimetallic element 51 which is surrounded by coil 52 connected to lead 50 and to a lead 53 connected to the battery of the vehicle. The member 47 of gage 27 is connected by lead 54 to ground and since the battery is grounded, this completes an electrical circuit.

The bimetallic member 51 has a pointer 56 pivotally connected thereto and swings around a dial 57 on the indicator 36 which is calibrated in tons, pounds, or suitable weight measuring units.

It is apparent that, within the scope of the present invention, modifications, and different arrangements may be made other than as herein disclosed, and the present disclosure is merely illustrative, the invention comprehending all variations thereof.

The present application is a continuation of my application filed May 21, 1956, Serial No. 586,275 now abandoned.

I claim:
1. A rectangular hydraulic weight measuring unit inter- posed between a spring and an axle of a vehicle with the longitudinal axis of said unit being parallel to the longitudinal axis of said spring, a pair of U bolts extending over said springs on opposite sides of said axle for securing said spring to said axle and retaining said unit between said spring and axle, said unit constituting a sealed liquid containing capsule operable as a weight measuring means and including a relatively thick inflexible metallic base plate, means carried by said base plate and engageable with said axle to position said plate with respect to said axle, a flexible metallic upper plate spaced from and peripherally fixed to said base plate, said flexible upper plate having a centrally reinforced portion arranged in alignment with the means carried by said base plate, said central reinforced portion positioned within the space between said plates, means formed in said upper plate and engageable with said spring to cooperate with the means on said base plate to position said unit between said spring and axle, said base plate having a recess formed therein of a size greater than the size of the central reinforcement portion of said upper plate whereby when said flexible upper plate moves toward said base plate upon a load to be measured being located in said vehicle, said centrally reinforced portion extends into said recess to compress the fluid between said base plate and said upper plate and a gauge connected to said unit to measure the weight of the load in said vehicle.

2. A hollow sealed fluid containing weighing unit forming means whereby the weight of a vehicle may be ascertained, said unit comprised of a pair of spaced metal plates, one of said plates being relatively inflexible and the other flexible and movable toward and away from said inflexible plate, said plates hermetically joined together around their peripheries, said unit arranged to be interposed between the spring and axle of said vehicle in the line of transmission of the load weight therethrough, said flexible plate having a centrally located reinforcement member on the inside face thereof, the flexible plate having a central opening therethrough and the upper portion of said reinforcement member having a partial opening in its upper portion constituting a continuation of said central opening in said upper plate, an anchoring element connected to the vehicle spring extending into both said openings to locate said unit with respect to said spring, said relatively inflexible plate having a depression larger than said reinforcement member on said upper plate to provide a space to receive said reinforcement member and the measuring fluid when said upper and lower plates are compressed toward each other; a centrally positioned anchoring element in the lower face of said lower plate in alignment with said central openings in said upper plate arranged to locate said unit to connecting means between said unit and the vehicle axle; and means to maintain said measuring unit between the spring and axle.

References Cited in the file of this patent
UNITED STATES PATENTS

| | | |
|---|---|---|
| 1,136,634 | Watres | Apr. 20, 1915 |
| 2,813,709 | Brier | Nov. 19, 1957 |
| 3,078,937 | Mehki et al. | Feb. 26, 1963 |